United States Patent [19]

Rodriguez et al.

[11] 4,340,385
[45] Jul. 20, 1982

[54] STABLE, CONCENTRATED, AQUEOUS COMPOSITIONS CONTAINING PARA-SULFOPHENYL-AZO-SUBSTITUTED 1,4-PHENYLENE-AZO-PARA-2-HYDROXY-PROPOXYPHENYL DYES

[75] Inventors: Silvio A. Rodriguez, Bamberg, S.C.; Sigmund C. Catino, deceased, late of Aiken, S.C., by Esther E. Catino, executor

[73] Assignee: Sandoz, Inc., E. Hanover, N.J.

[21] Appl. No.: 237,278

[22] Filed: Feb. 23, 1981

[51] Int. Cl.³ .............................................. D06P 67/00
[52] U.S. Cl. ........................................... 8/527; 8/609; 8/611; 8/681; 8/687; 260/174; 260/186; 8/924; 8/929
[58] Field of Search ................... 8/527, 609, 611; 260/186

[56] References Cited

U.S. PATENT DOCUMENTS

| | | | |
|---|---|---|---|
| 3,485,814 | 12/1969 | Speck | 260/186 |
| 3,681,320 | 8/1972 | Franklin | 260/175 |
| 3,862,119 | 1/1975 | Stingl | 260/186 |
| 3,932,378 | 1/1976 | Fasciati | 260/174 |
| 3,963,418 | 6/1976 | Tullio | 8/41 |
| 3,986,827 | 10/1976 | Dombchik | 8/41 |
| 4,055,560 | 10/1977 | Dombchik | 260/186 |
| 4,179,267 | 12/1979 | Lacroix et al. | 8/41 |

FOREIGN PATENT DOCUMENTS 731960 10/1969 Belgium .
1268702 3/1972 United Kingdom .

*Primary Examiner*—A. Lionel Clingman
*Attorney, Agent, or Firm*—Gerald D. Sharkin; Richard E. Vila; Melvyn M. Kassenoff

[57] ABSTRACT

Compounds of the formula

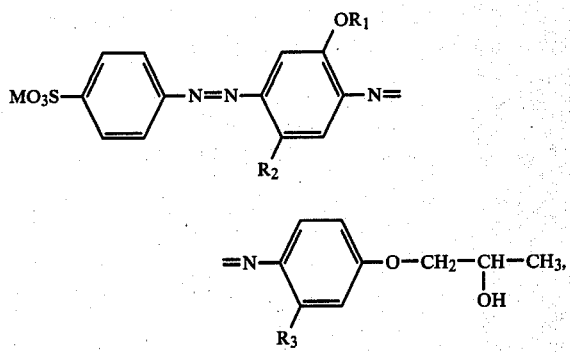

wherein
$R_1$ is $C_{1-4}$alkyl,
$R_2$ is hydrogen, $C_{1-4}$alkyl or $C_{1-4}$alkoxy,
$R_3$ is hydrogen or $C_{1-4}$alkyl, and
M is hydrogen or a monovalent non-chromophoric cation, and mixtures of such compounds, stable, concentrated, aqueous compositions consisting essentially of, by weight,
5–20% Compound of said formula in salt form or a mixture thereof
2–25% 2-(2-Methoxyethoxy)ethanol
0–8% Propylene glycol
Balance Water, and the use of such compounds, mixtures and stable, concentrated, aqueous compositions for dyeing and printing anionically dyeable substrates such as natural and synthetic polyamides, especially nylon carpet.

8 Claims, No Drawings

STABLE, CONCENTRATED, AQUEOUS COMPOSITIONS CONTAINING PARA-SULFOPHENYL-AZO-SUBSTITUTED 1,4-PHENYLENE-AZO-PARA-2-HYDROXY-PROPOXYPHENYL DYES

This invention relates to compounds of the formula

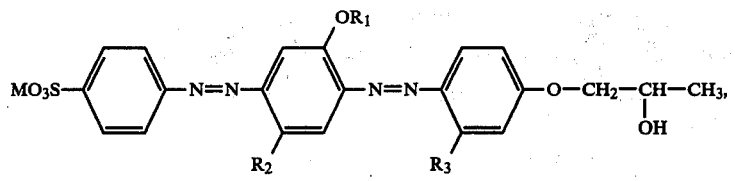

and mixtures thereof, wherein
$R_1$ is $C_{1-4}$alkyl,
$R_2$ is hydrogen, $C_{1-4}$alkyl or $C_{1-4}$alkoxy,
$R_3$ is hydrogen or $C_{1-4}$alkyl, and
M is hydrogen or a monovalent non-chromophoric cation,
compositions comprising such compounds and mixtures and the use of such compounds, mixtures and compositions for dyeing and printing anionically dyeable substrates such as natural and, particularly, synthetic polyamides.

$R_1$ is preferably $C_{1-2}$alkyl and most preferably methyl.

$R_2$ is preferably hydrogen, $C_{1-2}$alkyl or $C_{1-2}$alkoxy, more preferably hydrogen, methyl or methoxy and most preferably methyl.

$R_3$ is preferably hydrogen or $C_{1-2}$alkyl and more preferably hydrogen.

M is preferably hydrogen, lithium, sodium, potassium or ammonium, especially the cations, more preferably lithium or sodium and most preferably lithium.

The preferred mixtures are mixtures of the free acid and/or one or more salt forms, especially mixtures of salt forms, of a single compound of Formula I, i.e., mixtures of compounds having the same $R_1$, the same $R_2$ and the same $R_3$ but differing with respect to M. More preferred are mixtures of the lithium salt form of a compound of Formula I with one or more other salt forms of the same compound of Formula I wherein the molar ratio of lithium cations to the other cations is at least 5:1, e.g., 5:1–100:1 (anything above 100:1 being considered to be a pure compound), preferably at least 10:1, e.g., 10:1–100:1, and most preferably at least 20:1, e.g., 20:1–100:1. Even more preferred are mixtures of the lithium and sodium salt forms of a single compound of Formula I wherein the molar ratio of lithium to sodium cations is at least 5:1, e.g., 5:1–100:1, preferably at least 10:1, e.g., 10:1–100:1, and most preferably at least 20:1, e.g., 20:1–100:1.

In other words, most preferred are single compounds of Formula I wherein M is lithium and mixtures thereof with the corresponding compound wherein M is sodium wherein the molar ratio of lithium cations to sodium cations is at least 5:1, preferably at least 10:1, and most preferably at least 20:1.

Thus, the preferred compounds of Formula I are those wherein $R_1$ is $C_{1-2}$alkyl,
$R_2$ is hydrogen, $C_{1-2}$alkyl or $C_{1-2}$alkoxy, especially $C_{1-2}$alkyl, and
$R_3$ is hydrogen or $C_{1-2}$alkyl,
particularly those of these groups wherein M is lithium or sodium, especially lithium, and the preferred mixtures are mixtures of the lithium and sodium salt forms of a single such compound wherein the molar ratio of lithium cations to sodium cations is at least 5:1, e.g., 5:1–100:1, preferably at least 10:1, e.g., 10:1–100:1, and especially at least 20:1, e.g., 20:1–100:1.

The more preferred compounds of Formula I are those of the foregoing groups wherein
$R_1$ is $C_{1-2}$alkyl,
$R_2$ is hydrogen, methyl or methoxy, especially methyl, and
$R_3$ is hydrogen,
and the more preferred mixtures are mixtures of the lithium and sodium salt forms of a single such compound wherein the molar ratio of lithium cations of sodium cations is at least 5:1, e.g., 5:1–100:1, preferably at least 10:1, e.g., 10:1–100:1, and especially at least 20:1, e.g., 20:1–100:1.

The most preferred compounds of Formula I are those wherein
$R_1$ is methyl,
$R_2$ is methyl, and
$R_3$ is hydrogen,
particularly those of this group wherein M is lithium or sodium, especially lithium.

Thus, most preferred is the compound of the formula

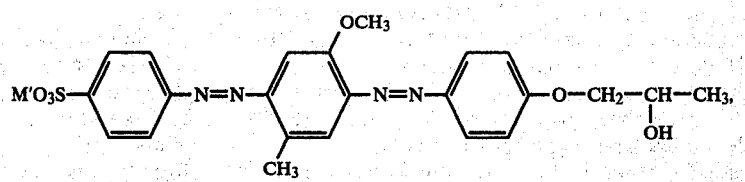

wherein M' is lithium and mixtures of this compound with the corresponding compound of Formula II wherein M' is sodium, wherein the molar ratio of lithium cations to sodium cations is at least 5:1, e.g., 5:1–100:1, preferably at least 10:1, e.g., 10:1–100:1, and especially at least 20:1, e.g., 20:1–100:1.

The compounds of Formula I and the mixtures thereof may be synthesized by the following reaction sequence:

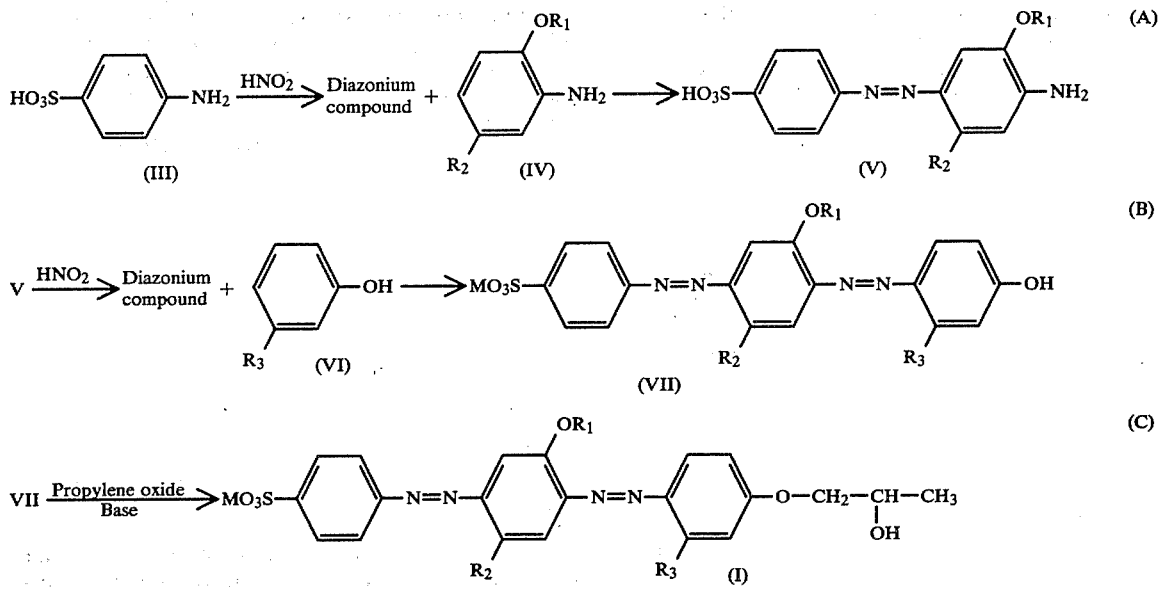

wherein $R_1$, $R_2$, $R_3$ and M are as defined above.

Each of the three reactions of the above reaction sequence is standard and may be carried out as described in the art. See, for example, U.S. Pat. Nos. 3,485,814, 3,594,363, 3,862,119, 3,932,378, 3,963,418, 3,986,827 and, particularly, U.S. Pat. No. 4,055,560. The starting materials and intermediates of Formulae III--VII are either known or are synthesizable by known processes from available starting materials.

Reaction C will, however, be discussed in some detail. It is preferably carried out at 65°-98° C., more preferably at 70°-95° C. Even though propylene oxide boils at about 35° C., the use of a closed, pressurized reaction vessel is unnecessary (although one may be used). The reaction is conveniently run by simply refluxing a basic mixture of propylene oxide and the intermediate of Formula VII in water. Typically, the reaction mixture is heated at 65° C. with stirring until the ensuing vigorous refluxing subsides. The reaction temperature is then raised to about 70° C. and maintained at that temperature with stirring until the ensuing vigorous refluxing subsides. The temperature is then raised to about 75° C. and maintained at that temperature with stirring until the ensuing vigorous refluxing subsides. This procedure is repeated with temperature increments of about five centigrade degrees until the pot temperature reaches about 97° C., and the reaction mixture is then stirred at 97°-98° C. for an additional 0.5-2 hours, preferably 1 hour. Neither Reaction A nor Reaction B requires any detailed discussion.

The preferred process is that set forth in Examples 1A-1C since the product obtained is a ready-to-use, stable, concentrated aqueous composition.

Since Reactions B and C are conducted under basic conditions, the compounds of Formula I, or mixtures thereof, are obtained in salt form with the cation being that of the base utilized. The use of a mixture of bases results in mixtures of salt forms as does the use of a base whose cation differs from cations already present in the reaction mixture. However, if the reaction mixture is acidified prior to isolation of the product of Reaction C, the compounds of Formula I, or mixtures thereof, are obtained in free acid form. The compounds of Formula I may be converted from free acid form to salt form or mixture of salt forms or vice versa or from one salt form to another by conventional means, e.g., ion exchange, acidification of a salt form or a mixture of salt forms and/or neutralization of the free acid form with an appropriate base or mixture of bases.

Mixtures of different compounds of Formula I may be prepared by simply mixing two or more such compounds or by utilizing in Reaction A, Reaction B and/or Reaction C two or more different reactants of Formula III, IV, V, VI and/or VII, as desired. Mixtures of salt forms of one or more compounds of Formula I may be obtained as set forth above.

The compounds of Formula I and mixtures thereof may be isolated in accordance with conventional methods, if desired.

As set forth supra, the compounds of Formula I and mixtures thereof are preferably in lithium salt form or mixed lithium/sodium salt form wherein the molar ratio of lithium cations to sodium cations is at least 5:1, more preferably at least 10:1 and most preferably at least 20:1. These salt forms possess excellent solubility in water, for example at room temperature, and may be obtained as, and are extremely suitable for formulation into, ready-to-use stable, concentrated aqueous compositions.

The compounds of Formula I and mixtures thereof may be formulated into solid and liquid compositions that are conventionally used for disazo acid dyes intended for, for example, the dyeing or printing of anionically dyeable substrates such as nylon carpet. Such formulations are disclosed in, for example, U.S. Pat. Nos. 3,963,418 and 3,986,827.

However, the preferred compositions, from the standpoint of ease of preparation and use are stable, concentrated, aqueous compositions consisting essentially of, by weight:

5-20% Compound of Formula I or a mixture thereof
2-25% 2-(2-Methoxyethoxy)ethanol (Methyl Carbitol ®)
0-8% Propylene glycol
Balance Water The preferred, more preferred and most preferred compounds of Formula I for use in the stable, concentrated, aqueous compositions of this invention are the preferred, more preferred, most preferred, etc. compounds of Formula I, wherein, in each case, M is a monovalent non-chromophoric cation and is preferably lithium. The preferred, more preferred, most preferred, etc. mixtures of compounds of Formula I for use in the stable, concentrated, aqueous compositions are mixtures of salt forms of a single compound of Formula I, particularly mixtures of the lithium and sodium salt forms of a single compound of Formula I wherein the molar ratio of lithium cations to sodium cations is at least 5:1, e.g., 5:1–100:1, preferably at least 10:1, e.g., 10:1–100:1 and most preferably at least 20:1, e.g., 20:1–100:1.

The amount of the compound of Formula I, or a mixture thereof, is preferably 8–18% and most preferably 10–17%, by weight.

The amount of 2-(2-methoxyethoxy)ethanol is preferably 3–15%, more preferably 4–10% and most preferably 5–7%, by weight.

The amount of propylene glycol is preferably 0–6% and more preferably is 0–4%, by weight.

Thus, the preferred stable, concentrated, aqueous compositions of this invention are those that consist essentially of, by weight:

8–18% Compound of Formula I wherein $R_1$ is $C_{1-2}$alkyl, $R_2$ is hydrogen, $C_{1-2}$alkyl or $C_{1-2}$alkoxy, $R_3$ is hydrogen or $C_{1-2}$alkyl, and M is a monovalent non-chromophoric cation, especially lithium, or a mixture of salt forms of a single such compound, especially mixtures wherein M is lithium or sodium and the molar ratio of lithium cations to sodium cations is at least 5:1, e.g., 5:1–100:1, preferably at least 10:1, e.g., 10:1–100:1 and most preferably at least 20:1, e.g., 20:1–100:1

3–15% 2-(2-Methoxyethoxy)ethanol

0–6% Propylene glycol

Balance Water

Preferred stable, concentrated, aqueous compositions of this group are those wherein $R_2$ is $C_{1-2}$alkyl.

The more preferred stable, concentrated aqueous compositions of this invention are those that consist essentially of, by weight:

8–18% Compound of Formula I wherein $R_1$ is $C_{1-2}$alkyl, $R_2$ is hydrogen, methyl or methoxy, $R_3$ is hydrogen, and M is lithium, sodium, potassium or ammonium, especially lithium, or a mixture of salt forms of a single such compound, especially mixtures wherein M is lithium or sodium and the molar ratio of lithium cations to sodium cations is at least 10:1, e.g., 10:1–100:1, preferably at least 20:1, e.g., 20:1–100:1

4–10% 2-(2-Methoxyethoxy)ethanol

0–6% Propylene glycol

Balance Water

The most preferred stable, concentrated, aqueous compositions of this invention are those that consist essentially of, by weight:

10–17% Compound of Formula II wherein M' is lithium or a mixture thereof with the corresponding compound wherein M' is sodium, wherein the molar ratio of lithium cations to sodium cations is at least 10:1, e.g., 10:1–100:1, preferably at least 20:1, e.g., 20:1–100:1

4–8% 2-(2-Methoxyethoxy)ethanol 0.14 5% Propylene glycol

Balance Water

Preferred stable, concentrated, aqueous compositions of this group are those that consist essentially of, by weight, about:

15% Compound of Formula II wherein M' is lithium or a mixture thereof with the corresponding compound wherein M' is sodium, wherein the molar ratio of lithium cations to sodium cations is at least 20:1

6% 2-(2-Methoxyethoxy)ethanol

4% Propylene glycol

Balance (to 100%) Water

The stable, concentrated, aqueous compositions of this invention may be obtained by merely mixing the components thereof. However, as indicated above, they may be obtained directly by utilizing the processes of the examples. The propylene glycol results from the hydrolysis of some of the propylene oxide. If desired, the obtained stable, concentrated aqueous compositions may be diluted by adding water, 2-(2-methoxyethoxy)ethanol and/or propylene glycol or made more concentrated by adding additional dye and/or evaporating some of the solvent.

As set forth above, the compounds of Formula I and mixtures thereof and the stable, concentrated aqueous compositions of this invention are useful for printing and, particularly, dyeing substrates dyeable with anionic dyes such as natural and, particularly, synthetic polyamides, e.g., nylons such as nylon 66, by known methods, for example pad dyeing and exhaust dyeing, especially the latter, inasmuch as the compounds of Formula I and mixtures thereof build-up well from an essentially neutral, aqueous dyebath, i.e., from a weakly alkaline to weakly acid, aqueous dyebath. They are particularly suitable for the dyeing of nylon carpet.

The compounds of formula I and mixtures thereof migrate well and give even dyeings on, for example, stripy nylon. The obtained dyeings on, for example, nylon possess good all-around fastness properties, for example fastness to light, water, washing and sweat. The shades of the obtained dyeings range from yellow to orange.

The concentrated, aqueous compositions of this invention possess excellent hot and cold stability.

The following examples serve to illustrate the invention.

EXAMPLE 1A

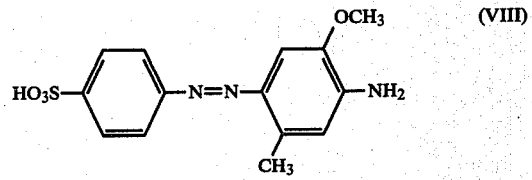

(VIII)

(i) 51.9 g. (0.3 mole) of sulfanilic acid and 55.2 g. (47.6 ml.) of 30% hydrochloric acid are rapidly stirred in 112.5 ml. of water for 1 hr. Sufficient ice chips (50 g.) are added thereto to lower the temperature to 5° C. Then 53.8 g. (41.7 ml.) of 40% (by weight) sodium nitrite solution (0.312 mole) is added dropwise to the stirred reaction mixture together with sufficient ice chips (107 g.) to maintain the reaction temperature at 10°–15° C. The reaction mixture is stirred at 10°–15° C. for 1 hr. and 0.75 g. of aminosulfonic acid is then slowly added to destroy the excess nitrite.

(ii) A solution of 2-methoxy-5-methylaniline is prepared by stirring at 40° C. a mixture of 41.8 g. (0.305 mole) of 2-methoxy-5-methylaniline, 37.8 g. (32.6 ml.) of 30% hydrochloric acid, 1.1 g. of an anionic dispersant and 101 ml. of water, heating the mixture to 50° C.

to complete dissolution and adding sufficient ice chips (30 g.) to lower the temperature to 30° C.

(iii) The diazonium solution of Part (i) is added portionwise over a period of 45-60 min. to the 2-methoxy-5-methylaniline solution of Part (ii), stirred at 25°–30° C., adding as needed sufficient ice chips (110 g.) to maintain the temperature at 25°–30° C. and sufficient 25% (by weight) sodium hydroxide solution (80 ml.) to maintain the pH at 3.5–4.5. The reaction mixture is then stirred at 25°–30° C. and a pH of 3.5–4.5 for 3 hrs. The resulting slurry is isolated by suction filtration and sucked dry for 20 min. to obtain 160 g. of wet presscake (60% solids).

EXAMPLE 1B

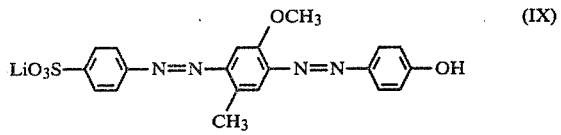

(i) 150 ml. of water is added to a smooth slurry of the product of Part (iii) of Example 1A (160 g.) in 118 ml. of water stirred for 10 min., the mixture is heated to 60°–65° C., and sufficient concentrated aqueous ammonia (23 ml.) is added to adjust the pH to 7.5 42.1 ml. of 40% (by weight) sodium nitrite solution is then added and, over the course of about 30 min., the warm (60°–65° C.) reaction solution is added in a slow stream to a stirred mixture of 70 ml. of 33% hydrochloric acid, 0.5 ml. of a defoaming agent, 1.0 ml. of 40% (by weight) sodium nitrite solution and 180 g. of ice chips during the course of which sufficient ice chips (150 g.) are added to maintain the temperature at 30° C., the initial temperature being about 0° C. The resulting slurry is stirred for an additional 30 min., and the diazonium intermediate is isolated by suction filtration, washed with 100 ml. of ice water and suction dried for 20 min. The product is mixed with 100 ml. of water and 50 g. of ice chips and stirred until a smooth slurry is formed.

(ii) 1.0 g. of lithium hydroxide.monohydrate is added to a mixture of 50 ml. of water, 31.5 g. of 88.9% phenol (=28 g. (0.298 mole) phenol) and 50 g. (48.3 ml.) of Methyl Carbitol ® (2-(2-methoxyethoxy)ethanol) followed by 150 g. of ice chips. The diazonium slurry of Part (i) is then gradually added (over the course of 45-60 min.) with stirring to the resulting reaction mixture along with sufficient lithium hydroxide.monohydrate to maintain the pH at 9.5-10 (about 13.5 g.) and sufficient ice chips to maintain the temperature at 10°–15° C. (about 85 g.). The reaction mixture is then stirred for an additional 30 min. (no further ice being added) and, when the coupling is over (as indicated by thin layer chromatography), sufficient glacial acetic acid (about 1 ml.) is added to adjust the pH to 9.0–9.2.

EXAMPLE 1C

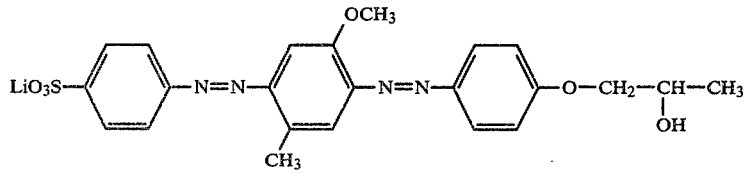

58.1 g. (70 ml.; 1 mole) of propylene oxide is added to the product of Part (ii) of Example 1B, the resulting reaction mixture is heated to 65° C. with stirring at which temperature vigorous refluxing commences, and the temprature is maintained at 65° C. until the refluxing subsides. The temperature is then raised to 70° C. and the reaction mixture is maintained at that temperature until the refluxing subsides. This is repeated at successively higher temperatures, each temperature increment being about five degrees centigrade, until the pot temperature raches 97° C. The reaction mixture is then stirred at 97°–98° C. for 1 hr. and, when no starting material is present as indicated by thin layer chromatography, cooled to 30° C. and sufficient glacial acetic acid (about 1–2 ml.) is added to adjust the pH to 7.0–7.4 to obtain an aqueous concentrate of the product.

The obtained stable, concentrated, aqueous composition consists essentially of, by weight:

15% Mixture of the compound of Formula X and the compound of Formula II wherein M' is sodium, the molar ratio of lithium cations to sodium cations being about 29.8:1
6% 2-(2-Methoxyethoxy)ethanol
4% Propylene glycol
Balance Water The product may be obtained as a solid by evaporation of the water, propylene glycol and 2-(2-methoxyethoxy)ethanol at reduced pressure. Pure compound of Formula X (e.g., 99% pure) may be obtained by utilizing ion exchange to exchange lithium cations for sodium cations. The compound of Formula X may be converted into free acid form by acidifying an aqueous solution or suspension thereof and evaporating the water at reduced pressure.

The following table sets forth additional compounds of Formula I which may be prepared by, for example, the processes of the foregoing examples and which may be obtained as or formulated into stable, concentrated aqueous compositions:

| | $R_1$ | $R_2$ | $R_3$ | M | Shade on nylon |
|---|---|---|---|---|---|
| Example 2 | —CH$_3$ | H | H | Li$^\oplus$ | Yellow |
| Example 3 | —CH$_3$ | —CH$_3$ | H | Na$^\oplus$ | Orange |
| Example 4 | —C$_2$H$_5$ | —CH$_3$ | H | Li$^\oplus$ | Orange |
| Example 5 | —CH$_3$ | —CH$_3$ | —CH$_3$ | Li$^\oplus$/Na$^\oplus$ (15:1) | Reddish-orange |
| Example 6 | —C$_2$H$_5$ | —OCH$_3$ | —C$_2$H$_5$ | NH$_4^\oplus$ | Reddish-orange |
| Example 7 | —CH$_3$ | —C$_2$H$_5$ | H | Li$^\oplus$/Na$^\oplus$ (25:1) | Orange |

APPLICATION EXAMPLE A (Continuous Dyeing of Polyamide Carpet)

Polyamide (e.g., high affinity nylon 6 or regular nylon 66) carpet is wetout with a composition consisting of 1-2 parts of decyl alcohol ethoxylated with 4 moles of ethylene oxide per mole of alcohol or a similar surfactant and 998–999 parts of water and squeezed to impregnate the wetting agent and reduce the total pick-up to 80–100%.

A dye liquor consisting of:
0.5–5 parts Liquid dye composition of Example 1C
1–2 parts Guar thickener (e.g., Celca Gum D-48-D)
1–2 parts Decyl alcohol ethoxylated with 4 moles of ethylene oxide per mole of alcohol (or a similar surfactant)
91–97.5 parts Water
Sufficient trisodium phosphate or acetic acid to adjust the pH to 4.0–8.0 depending on the substrate (e.g., 7–8 for high affinity nylon 6 and 4–5 for regular nylon 66)
is applied to the wetted polyamide carpet using a continuous applicator (e.g., Kuster) to achieve a wet pick-up of 300–600%. The orange dyed polyamide carpet is then steamed in a vertical or horizontal steamer for 4–10 min., rinsed with warm water and dried.

Other formulations of the dye of Example 1C and liquid and solid formulations of the dyes of Examples 2–7 may be utilized similarly.

APPLICATION EXAMPLE B (Continuous Dyeing Of Polyamide Carpet With Gum Displacement)

To polyamide (e.g., high affinity nylon 6 or regular nylon 66) carpet, wetout and squeezed as in Application Example A, a layer of gum consisting of:
10 parts Guar thickener (e.g., Celca Gum D-48-D)
0.25 part Glacial acetic acid
989.75 parts Water
is applied. The polyamide carpet is then steamed in a vertical steamer for 6 min., rinsed with warm water and dried.

A dye liquor consisting of:
0.5–5 parts Liquid dye composition of Example 1C
1–2 parts Guar thickener (e.g., Celca Gum D-48-D)
1–2 parts Decyl alcohol ethoxylated with 4 moles of ethylene oxide per mole of alcohol (or a similar surfactant)
91–97.5 parts Water
Sufficient trisodium phosphate or acetic acid to adjust the pH to 4.0–8.0 depending upon the substrate (e.g., 7–8 for high affinity nylon 6 and 4–5 for regular nylon 66)
is applied to the thus treated polyamide carpet using a continuous applicator (e.g., Kuster) to achieve a wet pick-up of 300–600%. The orange dyed polyamide carpet is then steamed in a vertical or horizontal steamer for 4–10 min., rinsed in warm water and dried.

Dyeings may be made in the same manner utilizing other formulations of the dye of Example 1C, liquid and solid formulations of the dyes of Examples 2–7 and liquid and solid formulations of mixtures of two or more of the dyes of Examples 1C-7.

APPLICATION EXAMPLE C (Exhaust Dyeing Of Nylon Yarn)

100 parts of pre-wetted nylon 66 yarn are added to a dyebath at 26°–27° C. consisting of:
1 part Liquid dye composition of Example 1C
1–2 parts Oleylamine (a levelling agent)
1 part Monosodium phosphate
3000 parts Water
The dyebath is heated to boiling temperature, 1 part of glacial acetic acid is added, and the dyebath is maintaned at this temperature for 45 min. The water that evaporates during dyeing is continuously replaced. The orange nylon 66 yarn is then removed from the dyebath, rinsed with warm water and dried.

Other formulations of the dye of Example 1C and liquid and solid formulations of the dyes of Examples 2–7 may be similarly utilized.

APPLICATION EXAMPLE D (Exhaust Dyeing Of Polyamide Fabric)

100 Parts of pre-wetted synthetic polyamide, for example nylon 66, are entered at 40° C. into a dyebath consisting of:
2 parts Dye of Example 1C
10 parts Anhydrous sodium sulfate
4000 parts Water
The dye liquor is heated over the course of 30 min. to boiling temperature and kept at this temperature for 1 hr. 4 Parts of glacial acetic acid are then added thereto and dyeing is completed with heating for a further 30 min. at boiling temperature. The water that evaporates during dyeing is continuously replaced. The orange dyed nylon cloth is then removed from the liquor, rinsed with water and dried. Wool may also be dyed by the same process.

Dyeings may be made in the same manner using the dyes of Examples 2–7 or mixtures of two or more of the dyes of Examples 1C to 7.

APPLICATION EXAMPLE E (Printing Of Polyamide Fabric)

Polyamide is printed with a printing paste containing:
30 parts Dye of Example 1C
50 parts Urea
50 parts Solubilizng agent (e.g., thiodiethylene glycol)
290 parts Water
500 parts Thickening agent (e.g., one based on carob bean gum)
20 parts Acid-donating agent (e.g., ammonium tartrate)
60 parts Thiourea
The printed textile goods are steamed for 40 min. at 102° C. (saturated steam), rinsed cold, washed at 60° C. with a dilute solution of a conventional detergent and rinsed again with cold water. An orange print is obtained.

In analogous manner, printing pastes may be made employing the dyes of Examples 2–7 or mixtures of two or more of the dyes of Examples 1C-7. Such pastes may be employed for printing in accordance with the above given procedure.

What is claimed is:

1. A stable, concentrated, aqueous composition consisting essentially of, by weight,
5–20% of a compound having the formula:

$$M''O_3S-\bigcirc-N=N-\bigcirc(OR_1)(R_2)-N=$$

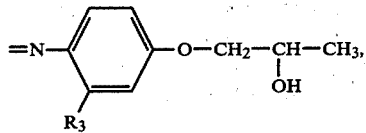

or a mixture of such compounds, wherein
$R_1$ is $C_{1-4}$alkyl,
$R_2$ is hydrogen, $C_{1-4}$alkyl or $C_{1-4}$alkoxy,
$R_3$ is hydrogen or $C_{1-4}$alkyl, and
$M''$ is a monovalent non-chromphoric cation,
2-25% of 2-(2-methoxyethoxy)ethanol,
0-8% of propylene glycol and, to 100%, water.

2. A stable, concentrated, aqueous composition according to claim 1 consisting essentially of, by weight,
8-18% of a compound of the formula

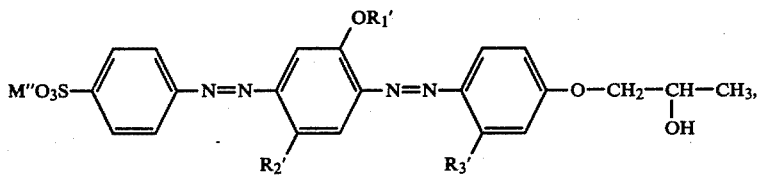

or a mixture of salt forms of a single such compound, wherein
$R_1'$ is $C_{1-2}$alkyl,
$R_2'$ is hydrogen, $C_{1-2}$alkyl or $C_{1-2}$alkoxy,
$R_3'$ is hydrogen or $C_{1-2}$alkyl, and
$M''$ is a monovalent non-chromophoric cation,
3-15% of 2-(2-methoxyethoxy)ethanol,
0-6% of propylene glycol and, to 100%, water.

3. A stable, concentrated, aqueous composition according to claim 2 wherein $R_2'$ is $C_{1-2}$alkyl.

4. A stable, concentrated, aqueous composition according to claim 2 consisting essentially of, by weight,
8-18% of a compound of the formula

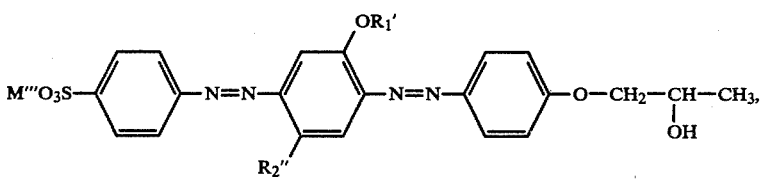

or a mixture of salt forms of a single such compound, wherein
$R_1'$ is $C_{1-2}$alkyl,
$R_2''$ is hydrogen, methyl or methoxy, and
$M'''$ is lithium, sodium, potassium or ammonium,
4-10% of 2-(2-methoxyethoxy)ethanol,
0-6% of propylene glycol and, to 100%, water.

5. A stable, concentrated, aqueous composition according to claim 4 wherein $M'''$ is lithium or a mixture of lithium and sodium wherein the molar ratio of lithium cations to sodium cations is at least 10:1.

6. A stable, concentrated, aqueous composition according to claim 5 consisting essentially of, by weight,
10-17% of the compound of the formula

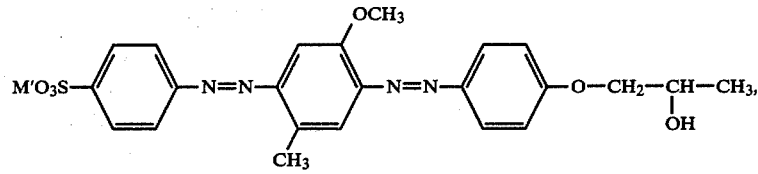

wherein $M'$ is lithium, or a mixture of such compounds wherein $M'$ is lithium or sodium, wherein the molar ratio of lithium cations to sodium cations is at least 10:1,
4-8% of 2-(2-methoxyethoxy)ethanol,
0-5% of propylene glycol and, to 100%, water.

7. A stable, concentrated, aqueous composition according to claim 6 wherein said molar ratio is at least 20:1.

8. A stable, concentrated, aqueous composition according to claim 7 consisting essentially of, by weight, about:
15% of the compound of the formula

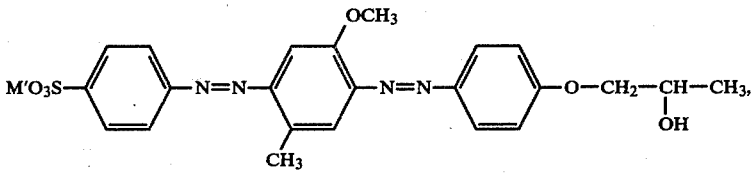

wherein $M'$ is lithium, or a mixture of such compounds wherein $M'$ is lithium or sodium, wherein the molar ratio of lithium cations to sodium cations is at least 20:1,
6% of 2-(2-methoxyethoxy)ethanol,
4% of propylene glycol and, to 100% water.

* * * * *